1,818,103

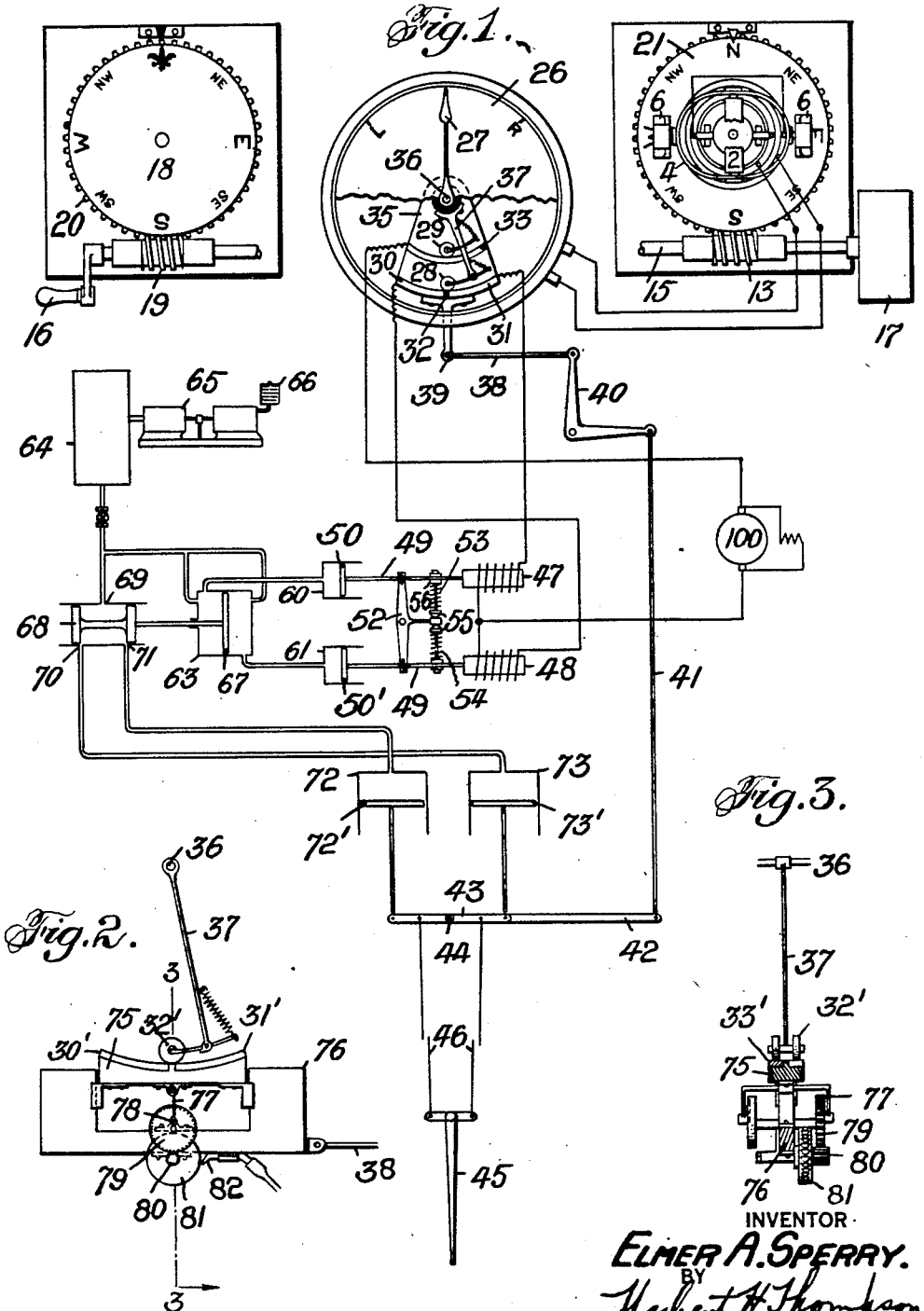
Aug. 11, 1931.     E. A. SPERRY     1,818,103
AUTOMATIC PILOT
Filed April 3, 1926     2 Sheets-Sheet 1
INVENTOR
Elmer A. Sperry.
BY Herbert H. Thompson
his ATTORNEY Aug. 11, 1931.  E. A. SPERRY  1,818,103
AUTOMATIC PILOT
Filed April 3, 1926  2 Sheets-Sheet 2
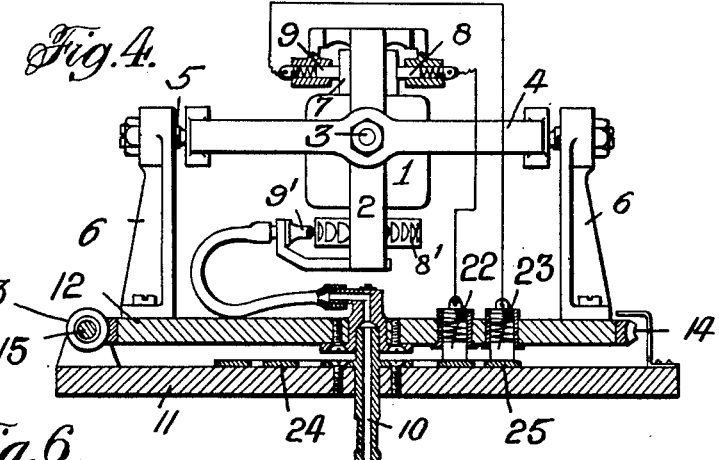
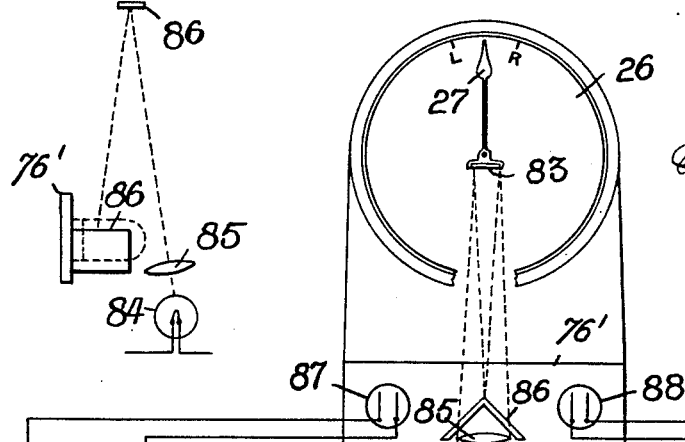
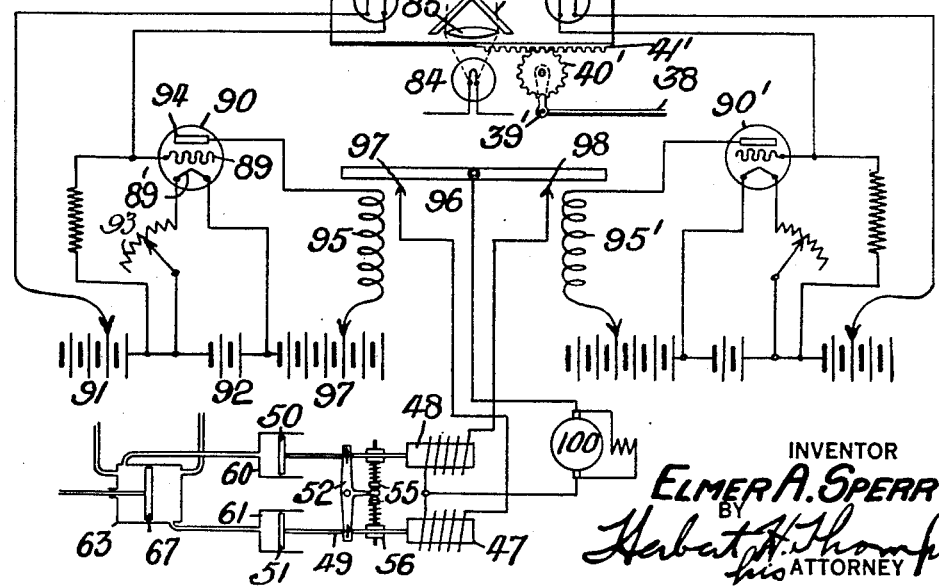
INVENTOR
ELMER A. SPERRY.
BY Herbert H. Thompson
his ATTORNEY Patented Aug. 11, 1931

UNITED STATES PATENT OFFICE

ELMER A. SPERRY, OF BROOKLYN, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK

AUTOMATIC PILOT

Application filed April 8, 1926. Serial No. 99,678.

This invention relates to automatic steering means for dirigible vehicles, such as ships and airplanes. One of the objects of my invention is to devise a method of steering automatically from the so-called earth inductor compass which employs a rotating armature in the earth's magnetic field to produce electrical indications of direction. In automatic steering devices employing gyroscopic direction maintaining means or a magnetic compass the steering is usually effected by means of a device which is responsive to the relative turning of the craft and gyroscope, the latter remaining fixed in direction. Such a method, however, is not adapted for use with the earth inductor compass since it possesses little or no directive force and dependence cannot be placed upon the same to maintain its position in azimuth.

I, therefore, propose to fix the earth inductor compass to turn with the aircraft and to utilize the variations in the electro-motive force produced by the inductor compass when placed in different positions in azimuth for effecting the steering. Preferably this is accomplished by maintaining the earth inductor device in a position where the electromotive force generated thereby is some definite value, preferably zero. This is accomplished by causing a servo-motor device actuating the rudder to be brought into action whenever an electrical indication in circuit with the "compass" varies from zero in a direction to navigate and bring the ship or airplane around in the proper direction, which carries with it the brushes on the earth inductor compass until the electrical indicator again shows zero reading. Changes of course are effected by adjusting the position of the compass or the brushes thereof on the craft which results in displacement of the indicator and consequent alteration in course.

My invention is not limited, of course, to any particular form of earth inductor compass or direction detecting device, but is applicable to any electrical means employing the change in E. M. F. produced by utilizing the earth's magnetic field under the different conditions produced by turning.

Another object of my invention is to devise an improved means for transmitting to a distance the movements of a sensitive indicator without interfering with the sensitiveness and accuracy of the same.

Referring to the drawings in which the preferred forms of my invention are shown, Fig. 1 is a diagrammatic view showing my invention applied to the automatic steering of aircraft.

Fig. 2 is a detail of a modified contactor system for effecting the control from the electrical indicator.

Fig. 3 is a section taken approximately on line 3—3 of Fig. 2.

Fig. 4 is a front elevation, partly in section, of the earth inductor compass.

Fig. 5 is a wiring diagram of a modified method of controlling the rudder from the electrical indicator.

Fig. 6 is a diagrammatic view of the indicator taken at right angles to Fig. 5.

The form of earth inductor compass shown comprises an armature 1 (Figs. 1 and 4) rotatably mounted in vertical ring 2 which in turn is journaled on a horizontal axis 3 in gimbal ring 4, the latter being in turn journaled on a horizontal axis 5 in brackets 6. The usual commutator is shown at 7, the brushes therefor 8 and 9 being, in this instance, fixed to the vertical ring 2. The rotor may be driven by compressed air as by having a bucket wheel 8' mounted on the shaft thereof against which is directed a blast of air from nozzle 9', air being led up through the tube 10 fixed in the base 11. Brackets 6 are preferably mounted on a rotatable base 12 which is shown as journaled on the top of tube 10. Means are provided to rotate the base 12, such as a worm 13 meshing with annular worm gear 14 on said base. The shaft 15 of said worm may be revolved to adjust the base to any desired position on the airplane. For this purpose I have shown a hand crank 16 for rotating the shaft in case the device is used on a ship or airplane carrying a pilot. I have also shown diagrammatically a servo motor device 17 adapted to be remotely controlled as by means of wireless or light rays or other radiant energy device in case the device is used on a torpedo or torpedo ship without a pilot or on an aerial torpedo. Such a system is disclosed in my prior application, now Patent No. 1,792,937, dated February 17, 1931, for wireless controlled aerial torpedoes and in the British patent corresponding thereto 12,-483/24. Of course, both the direct and remote control devices may be utilized in the same airplane if desired, for instance, where a pilot is present but the plane is being controlled primarily from a distance for test purposes.

When a hand control is used, I mount adjacent thereto a dummy compass card 18 which is rotated from a worm 19 meshing with worm wheel 20 thereon Said card may be reproduced on the base of the earth inductor compass as shown at 21. Current is shown as led from brushes 8 and 9 to spring-pressed contacts 22—23 engaging annular collector rings 24—25 on the fixed base 11 from which current is led to the electrical indicator 26 which acts as the controller for effecting the automatic steering.

Said indicator is preferably in the form of a zero-reading sensitive galvanometer having a needle or other part 27 pivoted at 36 movable in two directions depending on the direction of the current flowing therethrough, which in turn is responsive to the direction in which the "compass" is being turned away from the magnetic pole. Secured to said needle so as to move therewith are means for bringing into action the servo motor to actuate the rudder. In Fig. 1 this means is shown as an electrical contact system consisting of one or more trolleys 28—29, the former engaging contact sectors 30—31 which are separated by insulated sector 32 and the latter engaging the continuous sector 33. Said sectors are preferably mounted on a movable arm 35 pivoted on the same center 36 as the trolley arm 37, said arm being adjustable to provide a follow-up connection from the rudder. This connection is shown diagrammatically in the form of a link 38 connected to an arm 39 secured to said sector 35, said link being actuated by bell crank lever 40. Said bell crank lever in turn is connected by link 41 to an arm 42 connected to the bar 43 pivoted at 44. Said bar is shown as actuating the rudder 45 through wires 46.

Contacts 30—31 are shown as in circuit respectively with solenoids 47—48 or other electro-magnetic device. Said solenoids are connected directly or indirectly to a valve mechanism for operating the rudder servo motor. As shown the said solenoids are connected through rods 49 to small pistons 50—50', operating in cylinders 60—61. Resilient means may be provided to centralize the pistons and solenoids, such as the T-shaped lever 52 loosely connected at its opposite ends to the rods 49 and centralized by compression springs 53—54 operating between heads 55 on the rods supporting the same and fixed stops 56. Said cylinders 60—61 are in communication respectively with the forward portion and rearward portion of a larger cylinder 63. Both sides of said cylinder are also in communication with a reservoir 64 of compressed (or rarefied) air, the same being replenished by an air pump 65 driven by any suitable means. The pump is shown as comprising two stages and as having an air filter 66 at the entrance thereto to keep dust out of the system. Within said cylinder 63 is a piston 67 connected to a piston or other valve 68 which controls the flow of air to the servo motor. When centralized, said valve lies with the entrance port 69 from the air reservoir in the middle thereof and with the exit ports 70 and 71 slightly uncovered to a like extent so that the same air pressure is maintained in the two servo motor cylinders 72—73. When, however, solenoid 47 is excited for instance, piston 50 is drawn to the right, suddenly reducing pressure on the left hand side of the piston 67. Since the area of piston 50 is much less than that of 67, a weak force exercised by the solenoid connected to the piston 50 will exert a much greater force on the valve 68. This will move the piston 67 to the right thereby placing port 69 into full communication with port 70 and placing port 71 in communication with the atmosphere. If a pressure system is employed this will force piston 73' in cylinder 73 outwardly and piston 72' in cylinder 72 inwardly rotating the rudder 45 clockwise and turning the plane counter-clockwise to bring the pointer 27 and the trolley connected thereto back to zero.

If a change of course is desired, the rod 15 is rotated either by hand or by remote control as explained, resulting in a turning of the earth inductor compass through the number of degrees it is desired to change the course. This, of course, will immediately result in a displacement of the pointer 27 and of the connected contacts from the zero position which will bring the plane around to such a position as to turn the earth inductor compass back to its original position. It will be understood, of course, that the earth inductor compass is originally rotated in the opposite direction from which it is desired to turn.

In order to place as little load as possible on the sensitive galvanometer needle, I may provide means to reduce the friction between the trolleys and contact sectors. In Fig. 2 one method of accomplishing this purpose is illustrated. According to this modification the contact segments 30'—31' and 33' (see Fig. 3) are mounted on a block 75. Said block in turn is slidably mounted to move away from the trolleys 32' in the carriage 76, said carriage in turn being connected to the follow-up linkage 38 as before. Means are provided to continuously reciprocate block 75 toward and away from the trolleys so that the contact segments are out of contact with the trolleys the greater portion of the time but make contact with them at frequent intervals. To this end a crank arm 77 may be connected at one end to the block 75 and at the other end to the crank pin 78 on the gear 79. The latter in turn is driven from the pinion 80 on the shaft of the air turbine wheel 81 driven from the suitable nozzle 82. By this or similar means the friction between the contacts may be materially reduced.

Still a further method of taking the load off the galvanometer needle is by employing a system of light or heat rays in place of an electrical contact system. One such method is shown in Figs. 5 and 6 in which all parts are removed from the needle 27 except a mirror 83 curved in at least one plane. Rays from a source of light 84 are directed on said mirror by lens 85 and are reflected by the mirror on to a V-shaped or bi-angle mirror 86, the lens and mirror 83 being designed to concentrate the beam in the form of a line or point at the apex of the mirror 86 as indicated in dotted lines. By this system a very slight movement of needle 27 will result in an appreciable movement of the beam on mirror 86, thus greatly increasing the sensitivity of the control. The mirror 86 is shown as mounted on the slidable block 76', the position of which is adjusted by the follow-up link 38 which in this case is connected to an arm 39' secured to the pinion 40' meshing with the rack bar 41' on member 36'. On either side of said mirror 86 is placed some form of photo-electric tubes or valves 87—88, which act to open and close the circuit between battery 91 and grid 89 as light falls thereon or is cut off therefrom so that the charge on the grid is thereby changed. Said valves are employed preferably in connection with a power multiplying system and are balanced one against the other so that a preponderance of light rays on one valve actuates the rudder in one direction and vice versa. As shown, one element of each valve is connected to the grid 89 of the thermionic valve or audion bulb 90, while the other side is connected to a "C" battery 91. The filament 89' of said bulb is shown as lighted from the "A" battery 92 through a variable resistance 93, while the plate 94 is connected to the winding 95 on a relay 96 and is also in circuit with a "B" battery 97 the whole constituting an oscillatory circuit. The opposite winding 95' of the relay is similarly controlled from the photo-electric valve 88 through the audion bulb 90'.

It will be understood, of course, that the above outlined method or equivalents thereof of transmitting to a distance the movements of a sensitive indicator or actuating a power-driven follow-up or other mechanism therefrom is not limited to automatic steering or to the form of indicator shown herein, but has application wherever it is desired to actuate power or reproducing systems from a sensitive indicator.

Relay 96 is provided with contacts 97—98 in circuit with solenoids 47 and 48 or other electro-magnetic devices, current being shown supplied to the system by generator 100. The solenoids may control the rudder by the same means as shown in Fig. 1.

It will be seen that this system of automatic steering possesses certain advantages over systems wherein the control is effected from the course maintaining means itself since in those cases some load or other disturbing effect is necessarily placed upon such means which may result in error. In the present system, however, the earth inductor compass itself has no parts connected thereto for controlling the course, the course being governed entirely by the galvanometer. Also, this system lends itself to quick and accurate changes of course, since the pilot can turn his dummy card 18 quickly through the number of degrees that he desires to change the course with the assurance that the plane will be brought around to exactly the new course. In many prior systems of automatic control on the other hand new courses have to be arrived at by the cut and try method and cannot be set in advance.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an automatic steering device for dirigible craft, a controller responsive to course deviation, comprising a sensitive element, a mirror carried thereby, a source of light, a bi-angle mirror, a photo-electric valve on either side thereof, and a power multiplying system actuated by said valves for controlling the rudder.

2. In an automatic steering device for dirigible craft, a controller responsive to course deviation, comprising a sensitive element, a mirror carried thereby, a source of light, a bi-angle mirror, follow-up means for shifting said bi-angle mirror, a photo-electric valve on either side thereof, and a power multiplying system actuated by said valves for controlling the rudder.

3. In an automatic steering device for dirigible craft, a controller responsive to course deviation, comprising a sensitive element, a mirror carried thereby, a source of light, a bi-angle mirror, a photo-electric valve on either side thereof, a power multiplying system actuated by valves for controlling the rudder, and follow-up means for shifting said last-named mirror laterally.

4. In an automatic steering device for aircraft, an earth inductor compass, including a rotatable armature, adjustable brushes therefor and an electrical measuring instrument connected therewith, means for adjusting said brushes to alter the course, a servo motor for steering the craft, thermionic means for detecting movement of said instrument, and means brought into action thereby for operating said servo motor.

5. In an automatic steering device for dirigible craft, electrical means for detecting variation of the craft from its course, an electrical measuring instrument connected therewith, thermionic means responsive to change in the position of said instrument, and means brought into action thereby for governing the steering of the craft.

6. In an automatic steering device for dirigible craft, electrical means for detecting variation of the craft from its course, an electrical measuring instrument connected therewith, thermionic means responsive to change in the position of said instrument, means brought into action thereby for governing the steering of the craft, and a follow-back connection from said steering governing means to said measuring instrument.

In testimony whereof I have affixed my signature.

ELMER A. SPERRY.